(12) United States Patent
Shinozuka

(10) Patent No.: US 7,220,182 B1
(45) Date of Patent: May 22, 2007

(54) AXIALLY SPACED PERPENDICULARLY DISPOSED RIGIDLY SLIDABLE RADIAL DUAL TORQUE PIN UNIVERSAL ROTARY SHAFT COUPLING

(76) Inventor: Kinzou Shinozuka, 1 - 4 - 7 - 213, Seishincho, Edogawaku, 134-0087, Tokyo 132 (JP)

( * ) Notice: Subject to any disclaimer, the term of this patent is extended or adjusted under 35 U.S.C. 154(b) by 281 days.

(21) Appl. No.: 11/003,457

(22) Filed: Dec. 6, 2004

(51) Int. Cl.
*F16D 3/04* (2006.01)
(52) U.S. Cl. .................................... 464/103; 464/114
(58) Field of Classification Search ................ 464/110, 464/112–117, 119–121, 103, 905; 384/49, 384/447
See application file for complete search history.

(56) References Cited

U.S. PATENT DOCUMENTS

| | | | | |
|---|---|---|---|---|
| 78,571 | A | * 6/1868 | Bronson | 464/119 |
| 1,983,533 | A | * 12/1934 | Brown | 464/121 |
| 4,133,189 | A | * 1/1979 | Rineer | 464/121 |
| 4,141,226 | A | * 2/1979 | Sasahara | 464/117 |

FOREIGN PATENT DOCUMENTS

FR    2515129    * 10/1981

* cited by examiner

*Primary Examiner*—Daniel P. Stodola
*Assistant Examiner*—Daniel J. Mills
(74) *Attorney, Agent, or Firm*—Peter Gibson

(57) ABSTRACT

Large parallel and angular misalignment capabilities between coupled rotary shafts are provided in a torsionally rigid coupling by slidable and rotatable medial mounting of each of two radial, axially spaced, perpendicularly disposed torque pins through axially spaced radially perpendicular apertures through an axial connector and slidably trapping each end of each radial torque pin in an arcuate path between two apposed arms of one of two radially opposed forks projecting inwardly about either end of the axial connector from one of two yoked hubs. The perpendicular relation of the torque pins and slidable and rotatable medial mounting through the axial connector with ends trapped in opposed arcuate paths between radially opposed forks of each yoked hub allows displacement of the torque pins, with respect to the axial connector or the yoked hubs, about three mutually perpendicular axes thereby accommodating parallel and angular misalignment between coupled rotary shafts.

30 Claims, 1 Drawing Sheet

AXIALLY SPACED PERPENDICULARLY DISPOSED RIGIDLY SLIDABLE RADIAL DUAL TORQUE PIN UNIVERSAL ROTARY SHAFT COUPLING

BACKGROUND OF THE INVENTION

1. Field of the Invention

The present invention relates generally to rotary shaft couplings, particularly to rotary shaft couplings transmitting torque via radially directed pins, and most specifically to rotary shaft couplings transmitting torque via radially directed pins that are further bearing mounted.

2. Discussion of the Prior Art

Use of two perpendicular torque transmitting radially directed pins, or more accurately one pin and two opposed pin portions, or four pin portions, contacting a central member with intersecting axes is well known in what is commonly called a Cardan joint. Bearing mounted pins in a Cardan joint also known include: GB 0 284 089, GB 0 680 213, FR 1 186 634, and GB 2 129 524; while CH 0 364 666 discloses bearing mounting of the ends of a cruciform member with intersecting radial axes, similar to a Cardan joint, within the apposed ends of two radially perpendicular yokes.

Use of two perpendicular torque transmitting radially directed solid pins axially spaced apart from each other is less well known, bearing mounted or not. The only two known were disclosed by SU 0 317 842 and FR 2 515 129. Neither use bearings to mount the radial torque pins although the first uses bearings to mount each opposed hub of the coupling. Both provide for accommodation of angular misalignment: with axial slots for the ends of the pins in the former and a necked plastic bushing between the pins and the inwardly convex interior surface of the aperture through the coupling member for each pin in the second.

3. Statement of Need

While bearing mounting of intersecting axes radial torque pins in Cardan type rotary shaft couplings are known and axially spaced dual radial torque pins are known, and both are accommodative of angular misalignment between coupled shafts, no rotary shaft coupling utilizing radial torque pins capable of radial displacement, necessary for accommodation of parallel misalignment between coupled shafts, is known and a need for the same hence discerned.

SUMMARY OF THE INVENTION

1. Objects of the Invention

A first primary object of the present invention is the provision of a rotary shaft coupling that is accommodative of lateral misalignment between coupled shafts.

A second primary object of the present invention is the provision of a rotary shaft coupling that is accommodative of lateral and angular misalignment between coupled shafts.

A third primary object of the present invention is the provision of a torsionally rigid rotary shaft coupling that is accommodative of misalignment between coupled shafts.

Secondary objects of the present invention include provision of a torsionally rigid rotary shaft coupling accommodative of lateral and angular misalignment between coupled shafts that: is durable; is easily installed and maintained; and economically manufactured.

2. Principles Relating to the Present Invention

In achievement of the above stated objects it is suggested that: two axially spaced torque pins slidably engage two radially perpendicular apertures through an axial connector accommodating lateral misalignment between coupled shafts; a medial slide allow both radial sliding with respect to the axial connector and the coupling, i.e. axial sliding with respect to each torque pin, and rotary displacement about the axis of each torque pin with respect to the axial connector; each end of each torque pin be trapped in an arcuate path possessing a radius with respect to a midpoint between the two; whereby both lateral and angular misalignment in a torsionally rigid rotary shaft coupling is accommodated with reciprocating displacement of each end of each torque pin in the arcuate path combined with reciprocating radial and rotary displacement between each torque pin and the axial connector.

During operation angular misalignment between coupled shafts is accommodated by the cyclic oscillation of: the torque pins about a plane normal to the axis of aligned rotation and the ends of the axial connector about the axis of aligned rotation; with both pairs of cyclic oscillation, between the radially perpendicular axes of the two torque pins and the medial slides, being reciprocal to each other and coordinated by the reciprocating arcuate displacement of the ends of the torque pins in the arcuate paths disposed in radially perpendicular planes each normal to the axis of rotation of one coupled shaft.

Figure 1:
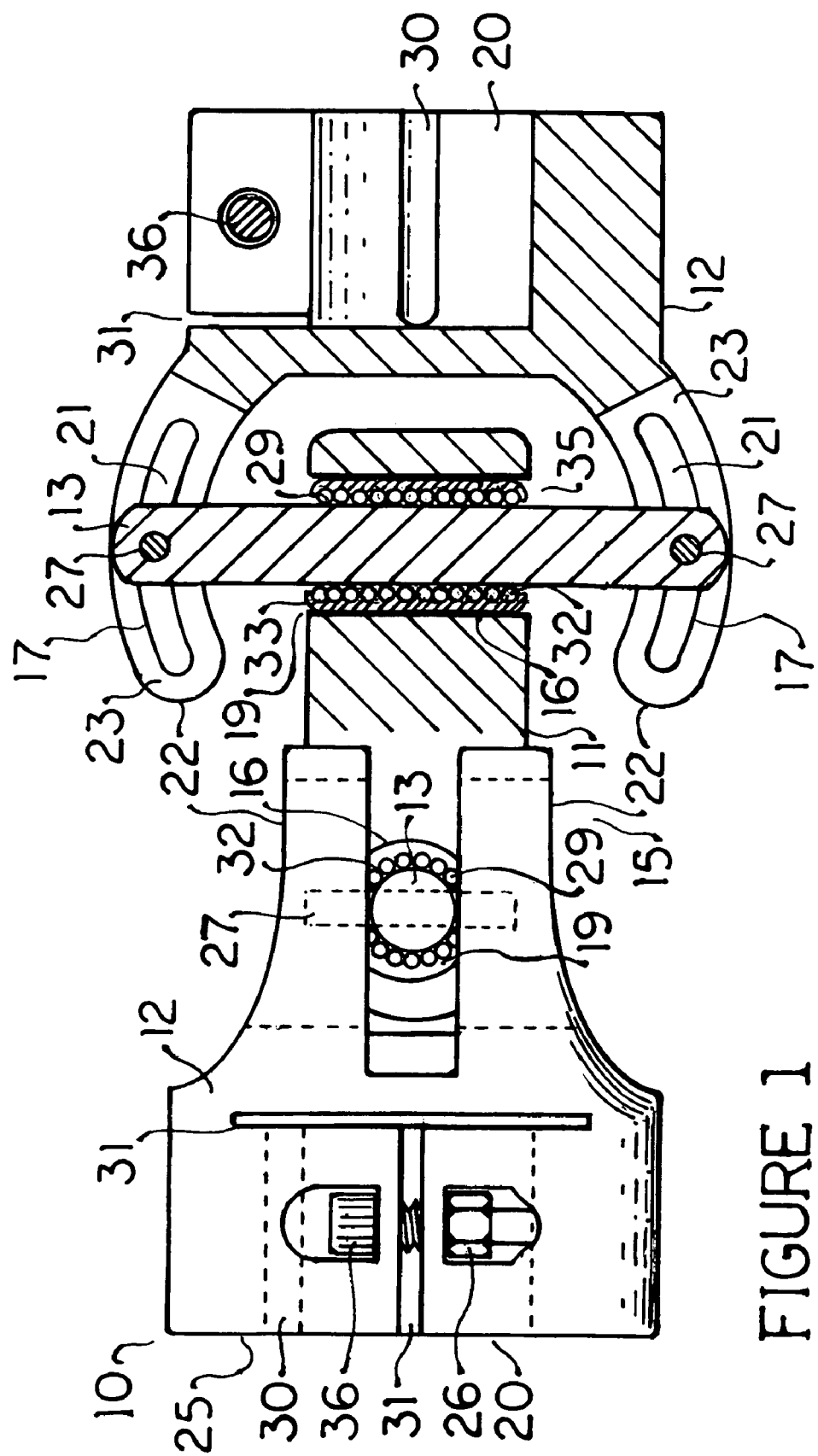
FIG. 1 is a lateral elevational view of a universal coupling in preferred accordance with the principles relating to the present invention on the left hand and a cross section of the same on the right hand taken from a plane through an aligned axis of the coupling.

| NOMENCLATURE | |
|---|---|
| 10 | universal coupling |
| 11 | axial connector |
| 12 | yoked hub |
| 13 | torque pin |
| 15 | fork |
| 16 | radial bore |
| 17 | distal slide |
| 19 | medial slide |
| 20 | shaft bore |
| 21 | arcuate slot |
| 22 | fork arm |
| 23 | apposed fork face |
| 25 | clamp |
| 26 | nut |
| 27 | transverse pin |
| 29 | ball bearing |
| 30 | keyway |
| 31 | straight slot |
| 32 | bearing race |
| 33 | frame |
| 35 | slide bearing |
| 36 | bolt |

DETAILED DESCRIPTION OF PREFERRED EMBODIMENT

As seen in FIG. 1 a universal coupling 10 in preferred embodiment of the principles relating to the present invention possesses a torsionally rigid axial connector 11 and two identical, axially rigid, yoked hubs 12 connected by two radially perpendicular torque pins 13 each having an end trapped in an arcuate path defined by distal slide 17 radially opposed forks 15 and held in a medial slide 19 contained in a radial bore 16 through either end of the axial connector 11. Each yoked hub 12 possesses a shaft bore 20 imparting, when coupling two rotary shafts, a fixed axis of rotation to each yoked hub 12. Parallel misalignment between shafts is accommodated by radial displacement of the perpendicularly disposed torque pins 13 relative the axial connector 11 enabled by the medial slides 16.

Angular misalignment between shafts is accommodated by the combination of the angular displacement of the torque pins 13 relative the yoked hubs 12 enabled by the distal slides 17 and the radial and rotary displacement between the torque pins 13 and the axial connector 11 enabled by the medial slides 16. Under a condition of angular misalignment between coupled rotary shafts the axial connector 11 remains aligned with a longitudinal axis normal the planes of rotation by the two radially perpendicular torque pins 13 and the two yoked hubs 12 each remain aligned with another axis at an angle, each one half of the included angle between yoked hub 12 axes, to the axis of the axial connector.

The torque pin 13 ends, however, oscillate within the arcuate paths defined by each fork 15 with each end phased by 180° from the other and these two opposed, balanced, oscillations phased by 90° from each other radially by the radially perpendicular relation of the torque pins 13 that can slide radially, axially with respect to the radial axis of each torque pin 13, and rotate, with respect to the axial connector 11 by virtue of the medial slide 19, thereby providing for displacement in three mutually perpendicular axes and torsionally rigid torque transfer between coupled rotary shafts while accommodating large parallel and angular misalignment. In the present example, depicted in full scale in FIG. 1, approximately 0.5" or 12 mm maximum of lateral, or parallel, and a maximum of 25° angular misalignment is accommodated. This assumes zero for the other misalignment. But a sine function is observed in combination values owing to the arcuate angular displacement with approximately ⅜" or 9 mm of parallel misalignment available at 15° angular misalignment between coupled shafts: 75% of the parallel at 60% of the angular misalignment.

It is considered that the medial slide 19 could be readily provided by any suitable means including a journal disposed in each radial bore 16 or as few as eight ball bearings 29 per torque pin: with four located at either end of the radial bore 16 concerned preferably in balanced pairs of ball bearings 29 on either side of the torque pin 13: the plane of the drawing with respect to the right hand, cut away, side of the axial connector 11 depicted in FIG. 1. A journal, however, while providing for low friction rotary displacement does not provide low friction displacement axially: with respect to the torque pin 13, the medial slide 19, or the radial bore 16; radially with respect to the longitudinal axis of the axial connector 11 or the aligned axis of rotation of the universal coupling 10.

The ball bearings 29, used separately or in ball bearing races 32, are preferably separated from each other to allow free rotation in any direction. A pair of ball bearing races 32, preferably located proximate the opposed ends of each radial bore 16, provides low friction axial displacement in addition to low friction rotary displacement, particularly if the ball bearings 29 in the race 32 are separated, i.e. radially spaced within the race 32. Since torque is proportional to the square of the radius a pair of ball bearing races 32 so disposed will provide adequate torque transmission capability. And a pair of ball bearing races 32 at either end of the radial bore 16, particularly if the ball bearings 29 are radially spaced within the race 32, provides a substantially equivalent construction with regard to function as the use of two opposed pairs of ball bearings 29 for either end of a torque pin 13.

The slide bearing 35 clearly shown in the cut away right hand portion of the axial connector 11 seen in FIG. 1 essentially comprises a plurality of ball bearing races 32 races lining the radial bore 16 and is preferred over use of two opposed races of ball bearings 29 for several reasons: a smaller diameter ball bearing 29 can be used; greater torsional rigidity resulting from a more even distribution of stress is obtained; and the radial bore 16 can be reduced, as shown, to a simple smooth cylindrical wall aperture. This last benefit, particularly, increases the manufacturing economy achieved as race surfaces adapted to keep a single ball bearing race 32 in place can be replaced with a purchased component: a slide bearing 35; that includes a frame 33 inserted into the smooth radial bore 16 disposing multiple ball bearing races 32 races, with the ball bearings 29 spaced apart from each other and radially staggered between adjacent races 32, in a configuration as shown in FIG. 1 when seen in cross section from the side. NSK corporation of Japan offers a range of such slide bearings for 3-50 mm shaft diameters.

FIG. 1 is full scale for a 12 mm φ torque pin 13 and a 21 mm φ radial bore 16 in accordance with use of NSK slide bearing model LB12NY with a length of 30 mm. Slide bearings of this type are fixed, in this case within a radial bore 16, by retention rings press fitted into the relieved or shouldered ends of the cavity and/or medially located retention rings, again not shown, engaging medial circumferential grooves in the exterior body of the slide bearing. In any case use of ball bearings 29, including ball bearing races 32, and particularly a slide bearing 35 possessing a plurality of ball bearing races 29 with the ball bearings 29 within each race preferably spaced apart radially, most preferably by the diameter of the ball bearings 29, is preferred for the medial slide 19.

It is noted in this regard that the axial force with respect to the slide bearing or radial bore 16 is expected in operation of a universal coupling 10 in preferred accordance with the principles relating to the present invention to be very small compared with the torque or the torsion anticipated because a medial slide 19 utilizing ball bearings 29, particularly is spaced apart radially, minimizes friction in axial displacement.

This aspect is also reflected in a distal slide 17 in preferred accordance with the principles relating to the present invention because all of the force transmitted between the ends of the torque pins 13 and the relevant forks 15 is normal to the torque pin 13 which are free to reciprocate within the arcuate path defined by each fork 15. While a ball bearing 29 could be used on either side of each end of the torque pins 13, trapped in an arcuate groove in the apposed faces of the fork arms 22 and a semi-spherical cavity on either side of the end of the torque pins 13, use of a transverse pin 27 trapped at either end in an arcuate slot 21 as shown in FIG. 1 is preferred while recognizing that a transverse pin 27 projecting only to one side through one arcuate slot 21 through only one fork arm 22 would provide a substantially equivalent function.

Each transverse pin 27 is preferably pressed fitted through a transverse bore through one end of a torque pin 13 after disposition within the forks 15 in assembly of a universal coupling 10 in preferred accordance with the principles relating to the present invention. Since the torque pin 13 in operation contacts one of two apposed fork faces 23 of the two fork arms 22 of a fork 15, depending on the direction of rotation, and the transverse pins 27 reciprocate in the arcuate slots 21 without significant axial force upon the same a simple hydraulic press fitting, as opposed to an interference or force fit, obtained by expansion or contraction or hot or cold members, is adequate and much easier and more economic than either elevating the temperature of the coupling, except for the torque pins 13, or cooling the torque pins 13 with liquid nitrogen, prior assembly.

The yoked hubs 12 are preferably identical and either machined, forged, or cast in high strength carbon alloy steel. It is suggested that the apposed fork faces 23, as the contact surfaces of the fork arms 22, be hardened, if not the entire fork 15 or yoked hub 12 or that chromium plating be applied to the apposed fork faces 23 in order to obtain superior wear resistance and maximum reduction in friction in contact with an end of a torque pin 13 and that the end of the torque pins 13, if not the entirety of the same, be hardened or chromium plated for the same reason. Appropriate heat treatment is recommended, particularly for cast yoked hubs 15, in order to restore resilience or reduce brittleness associated with a casting.

A two part mold for casting, or die for forging, with the part line bisecting the space between the fork arms 22, and the straight slot 31 if a clamp 25 with a bolt 36 and nut 26 is used for engagement of a shaft end as depicted in FIG. 1 is used, is suggested using an insert to obtain the space between the fork arms 22. This facilitates obtainment of arcuate slots 21 and all the other features of the yoked hub 12 in a casting or forging. The shaft bore 20 is also obtained with an insert. Forging or investment casting are specifically recommended for economic precision production but other types of casting, such as sand casting, and or machining can be utilized to manufacture the yoked hub 12. Machining alone is wasteful of steel and energy but easily results in a precision yoked hub 12 and while sand casting is generally less precise than investment casting it is considered adequate particularly for lower rotary speeds.

A set screw, not shown, could be used instead of a clamp 25 type engagement of a shaft, especially if a keyway 30 is utilized to prevent slippage between the engaged shaft and the shaft bore 20. It is emphasized that a keyway 30 is optional and that both this and the other aspects of shaft engagement utilized are essentially unrelated to the principles relating to the present invention but of importance to practical usage. Generally smaller shaft diameters can be adequately secured with set screws, larger diameters are better secured with a clamp 25, and keyways 30 are useful only with keyed shafts.

The foregoing is intended to provide one practiced in the art with the best known manner of making and using a preferred embodiment in accordance with the principles relating to the present invention and is not to be interpreted in any manner as restrictive of said the scope of said invention or the rights and privileges secured by Letters Patent for which I claim:

1. A rotary shaft coupling intended to accommodate both parallel and angular misalignment between coupled rotary shafts relative to an aligned axis of rotation, said rotary shaft coupling comprising:

an axial connector possessing two radially perpendicular radial bores axially spaced apart from each other, two torque pins, and two yoked hubs each possessing means for engaging the end of a rotary shaft including a shaft bore;

each said torque pin being slidably and rotatably mounted within one said radial bore by a medial slide allowing both radial and rotary displacement of said torque pin with respect to said axial connector;

each said yoked hub possessing two radially opposed forks each possessing two fork arms and two apposed fork faces defining an arcuate path within a plane normal to an axis of the yoked hub, the arcuate path possessing a radius with respect to a midpoint between said two radially opposed forks upon said axis;

each said torque pin being mounted at either end within one of said two radially opposed forks in a distal slide allowing slidable displacement in contact with one of said two opposed fork faces within said arcuate path and angular displacement of said opposed fork relative to said torque pin;

whereby both lateral and angular misalignment is accommodated in operation with radial displacement of said torque pins with respect to said axial connector and reciprocating arcuate displacement of each end of each torque pin in one said arcuate path combined with reciprocating radial and rotary displacement of each torque pin with respect to one of said two radial bores possessed by said axial connector.

2. The rotary shaft coupling of claim 1 wherein said means for engaging the end of a rotary shaft includes a shaft bore with a keyway.

3. The rotary shaft coupling of claim 1 wherein said means for engaging the end of a rotary shaft includes a clamp.

4. The rotary shaft coupling of claim 3 wherein said clamp uses a bolt traversing a straight slot through said yoked bore communicating with said shaft bore and engaging a nut.

5. The rotary shaft coupling of claim 1 wherein said arcuate path defined by each said fork is adjacent at least one transverse arcuate slot through one said fork arm in which an end of a transverse pin connected to one end of said torque pin is slidably trapped.

6. The rotary shaft coupling of claim 5 wherein said transverse pin is press fitted into a transverse aperture through one end of said torque pin.

7. The rotary shaft coupling of claim 5 wherein said arcuate path defined by each said fork is between two apposed transverse arcuate slots through both fork arms in which opposed ends of said transverse pin connected to one end of said torque pin are slidably trapped.

8. The rotary shaft coupling of claim 7 wherein said transverse pin is press fitted through a transverse aperture through one end of said torque pin.

9. The rotary shaft coupling of claim 1 wherein said torque pins, axial connector, and yoked hubs are made in high strength high carbon alloy steel.

10. The rotary shaft coupling of claim 9 wherein the surface of both ends of said torque pins made of high carbon alloy steel are hardened.

11. The rotary shaft coupling of claim 9 wherein the apposed faces of said forks made of high carbon alloy steel are hardened.

12. The rotary shaft coupling of claim 9 wherein the surface of both ends of said torque pins made of high carbon alloy steel are chrome plated.

13. The rotary shaft coupling of claim 9 wherein the apposed faces of said forks made of high carbon alloy steel are chrome plated.

14. The rotary shaft coupling of claim 1 wherein said yoked hubs are made by casting.

15. The rotary shaft coupling of claim 14 wherein said casting of said yoked hubs utilizes a two part mold with a part line between both apposed fork faces of both opposed forks.

16. The rotary shaft coupling of claim 1 wherein said yoked hubs are made by forging.

17. The rotary shaft coupling of claim 16 wherein said forging of said yoked hubs utilizes a two part die with a part line between both apposed fork faces of both opposed forks.

18. The rotary shaft coupling of claim 1 wherein said medial slide allowing both radial and rotary displacement of said torque pin with respect to said axial connector includes ball bearings each having contact with said torque pin.

19. The rotary shaft coupling of claim 18 wherein said ball bearings are radially spaced apart from each other.

20. The rotary shaft coupling of claim 18 wherein said ball bearings are balanced in opposed relation on opposite sides of the torque pin.

21. The rotary shaft coupling of claim 18 wherein said medial slide allowing both radial and rotary displacement of said torque pin with respect to said axial connector is comprised of at least two ball bearing races.

22. The rotary shaft coupling of claim 21 wherein two ball bearing races comprising said medial slide are located at opposed ends of said radial bore.

23. The rotary shaft coupling of claim 21 wherein said medial slide allowing both radial and rotary displacement of said torque pin with respect to said axial connector is comprised of more than three ball bearing races.

24. The rotary shaft coupling of claim 23 wherein the ball bearings in each race are radially spaced apart from each other.

25. The rotary shaft coupling of claim 24 wherein the ball bearings in each race are radially spaced apart from each other by a distance approximately equal to the diameter of the ball bearings.

26. The rotary shaft coupling of claim 25 wherein the ball bearings in each race are radially spaced apart from each other by approximately the diameter of the ball bearings and adjacent races are staggered radially evenly distributing contact of the ball bearings with the torque pin.

27. The rotary shaft coupling of claim 1 wherein said medial slide allowing both radial and rotary displacement of said torque pin with respect to said axial connector is comprised of a slide bearing possessing a frame disposing a plurality of axially spaced ball bearing races in a generally cylindrical configuration.

28. The rotary shaft coupling of claim 27 wherein the ball bearings in each race are radially spaced apart from each other.

29. The rotary shaft coupling of claim 28 wherein the ball bearings in each race are radially spaced apart from each other by a distance approximately equal to the diameter of the ball bearings.

30. The rotary shaft coupling of claim 29 wherein the ball bearings in each race are radially spaced apart from each other by approximately the diameter of the ball bearings and adjacent races are staggered radially evenly distributing contact of the ball bearings with the torque pin.

* * * * *